United States Patent [19]

McGuffey et al.

[11] Patent Number: 5,785,477
[45] Date of Patent: Jul. 28, 1998

[54] LAMINATED INTERNALLY THREADED FASTENER

[75] Inventors: Arnold L. McGuffey; David L. Remerowski, both of Cincinnati, Ohio

[73] Assignee: Senco Products, Inc., Cincinnati, Ohio

[21] Appl. No.: 745,039

[22] Filed: Nov. 7, 1996

[51] Int. Cl.⁶ .............................. F16B 37/08; F16B 21/18
[52] U.S. Cl. ........................ 411/432; 411/433; 411/527
[58] Field of Search ........................... 411/427, 432, 411/433, 437, 525, 526, 527, 937.1, 938

[56] References Cited

U.S. PATENT DOCUMENTS

| | | |
|---|---|---|
| 2,244,823 | 6/1941 | Burke .................. 411/527 X |
| 2,318,708 | 5/1943 | Parr ........................ 411/527 |
| 2,581,641 | 1/1952 | Forgaard . | 
| 3,233,262 | 2/1966 | Vollman . |
| 4,383,787 | 5/1983 | Reynolds ............... 411/221 |
| 4,900,209 | 2/1990 | Reynolds ............... 411/432 |

FOREIGN PATENT DOCUMENTS

| | | |
|---|---|---|
| 2829385 | 2/1979 | Germany . |
| 21133 | 6/1971 | Japan ..................... 411/527 |
| 1193751 | 6/1970 | United Kingdom . |

*Primary Examiner*—Neill R. Wilson
*Attorney, Agent, or Firm*—Jerrold J. Litzinger

[57] ABSTRACT

An internally threaded fastener assembled from formed laminae can be inexpensively and efficiently produced from a variety of materials in a multi-staged, die-operated, drawing press. Each lamina has an internal bore with less than one full thread form at the helix plane and is designed to be stacked in an aligned, alternating arrangement to provide full thread rotations along the interior of the assembled fastener.

6 Claims, 4 Drawing Sheets

LAMINATED INTERNALLY THREADED FASTENER

BACKGROUND OF THE INVENTION

1. Field of the Invention

This disclosure relates generally to a laminated internally threaded fastener,typically a nut, that can be manufactured from a variety of materials using a very inexpensive manufacturing process to produce laminae that are pre-threaded and easily assembled into a nut having properties equal or superior to a forged nut. Clearly, others have recognized the advantages of punching, stamping and stacking laminae to construct laminated nuts. Examples of patent art describing this technology and the advantages offered by this technology include the following references.

2. Description of the Prior Art

U.S. Pat. No. 3,233,262 to Vollman describes a laminated locknut that is assembled from a series of punched monoplanar laminae stacked within a cup-shaped housing and wherein the threads formed in certain laminae are displaced or axially out of phase relative to those formed in other laminae.

G.B. Patent 1,193,751 to Monticelli describes a resilient self-locking nut comprising a polygonal housing containing at least one resilient annular dished plate, internally contoured to be threaded onto a screw and externally contoured to rotate fast with the housing containing it and disposed between end plates which are flat on one side and contoured on the other to fit to the abutting surface of a resilient plate.

U.S. Pat. No. 2,581,641 to Forgaard discloses a nut comprising one or more elements of dished or conical form mounted in a pressure ring. The disclosure goes on to suggest that instead of using a pressure ring, the plates forming the element may be welded or otherwise secured together at the periphery, or elsewhere, so that the pressure ring can be dispensed with. However, the elements of the assembled nut are not individually threaded and must be stamped, then tapped after assembly.

U.S. Pat. No. 5,017,079 to Reynolds discloses a laminated nut wherein the laminae are characterized as conical spring disc washers that are held in a stacked, dished and aligned relationship so as to define a central opening that is tapped to match threads on an associated bolt. This laminated nut is further characterized by having a "cage" for holding the laminae in alignment and for providing a plurality of protrusions located at the base of the "cage". These protrusions are intended to prohibit tool engagement on the bottom side of the nut.

SUMMARY OF THE INVENTION

Notwithstanding the ingenuity and favorable features of the laminated nuts disclosed and suggested by the prior art, the fastening industry is always receptive to refinements in nut technology, especially when they contribute to savings in time and money. Accordingly, then, the laminated fastener disclosed herein is distinguished from and improves upon the prior art by providing an internally threaded fastener comprising a plurality of stacked laminae, each lamina having an internal bore with less than one full thread form at the helix plane and a periphery accommodating a wrenching tool.

DESCRIPTION OF THE PREFERRED EMBODIMENTS

Figure 1:
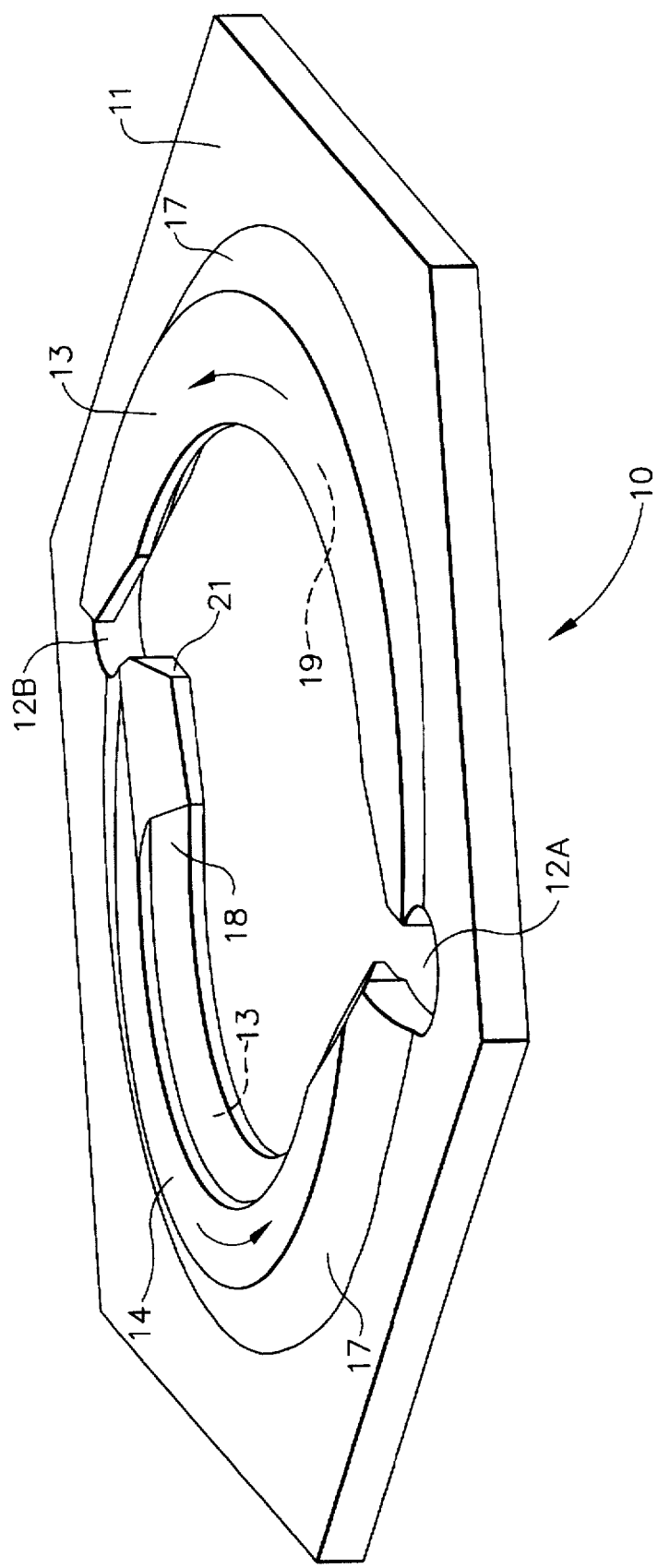
FIG. 1 is a perspective view of a lamina having two half-thread segments and a hex-shaped perimeter.
Figure 2:
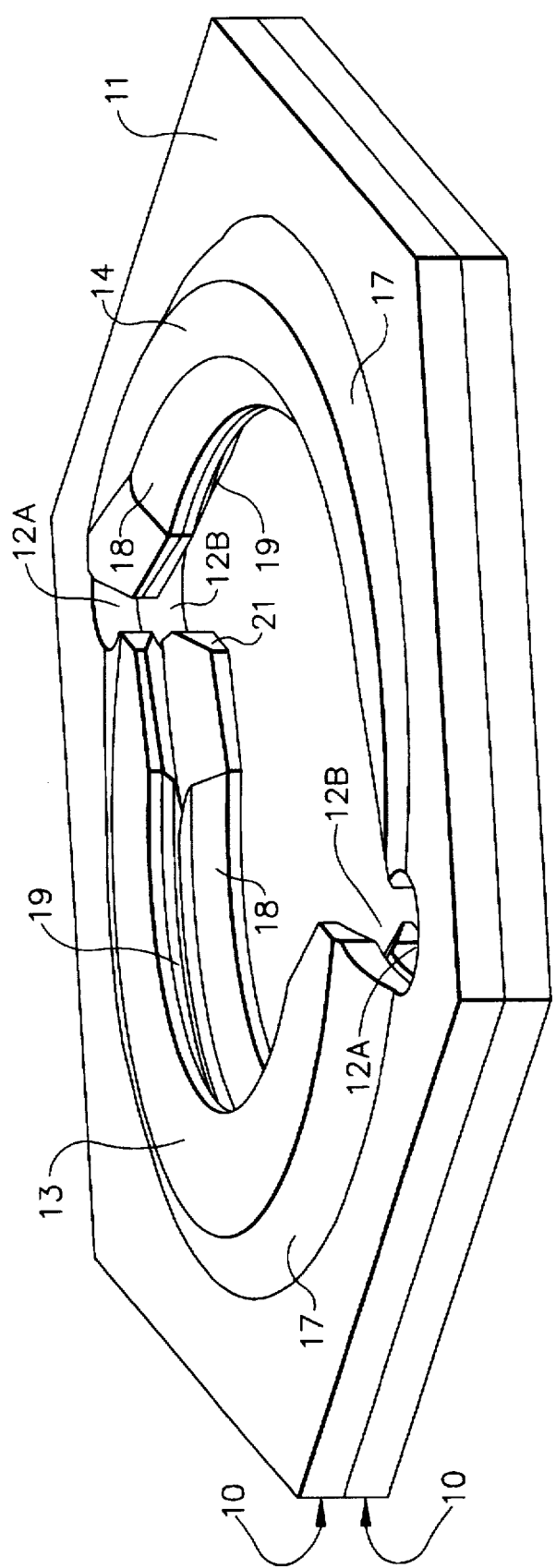
FIG. 2 is a perspective view of a laminated internally threaded fastener comprising a two-lamina assembly of the lamina of FIG. 1.

Referring to FIG. 1, a hex-shaped lamina 10 is depicted. The particular shape of the lamina is significant only so far as in a typical embodiment all the laminae of a particular laminated threaded fastener or nut would be the same shape. A hex-shaped lamina is depicted primarily because hex-shaped nuts are some of the most popular fastening devices. Clearly, the disclosed invention relates to laminated threaded fasteners of all shapes. Typically, of course, the laminae will be generally annular in shape with facets to provide a wrenching surface.

Continuing to refer to FIG. 1, it is apparent that the hex-shaped fastener is further defined by an area that can be referred to as the perimeter plane 11. Its purpose is to form the structure of the nut and support the structural elements of the internal thread. The internal thread is complex in that it comprises several elements. However, all these elements can manifest themselves in a single lamina thereby giving rise to ease of manufacture and assembly.

In addition to a perimeter plane 11, each lamina will include orientation holes 12, denominated as "A" and "B" holes to facilitate assembly. Each hole 12 will also accommodate a joining device, mechanism or procedure to permit joining the stacked laminae one to another in a permanent or semi-permanent arrangement. In one embodiment of the presently disclosed fastener, it is envisioned that a small rivet or screw device will be employed to join the laminae to form the assembled nut. Other methods and devices that can be used to join the laminae include welding, adhesives and "cages" as demonstrated in the prior art. The holes 12 are identified as "A" and "B" holes because in a preferred embodiment of the disclosed nut each lamina will provide one-half of the thread form at the helix plane and in assembly it is essential that the stacking be in an "A" to "B" relationship. By stacking or assembling in such a 180 degree relationship, the one-half thread that is characteristic of each lamina is continued by the adjoining lamina to form a full thread over a 180 degree rotation with two half-threads, which are then available to form complete threads when assembled with other laminae.

Figure 3:
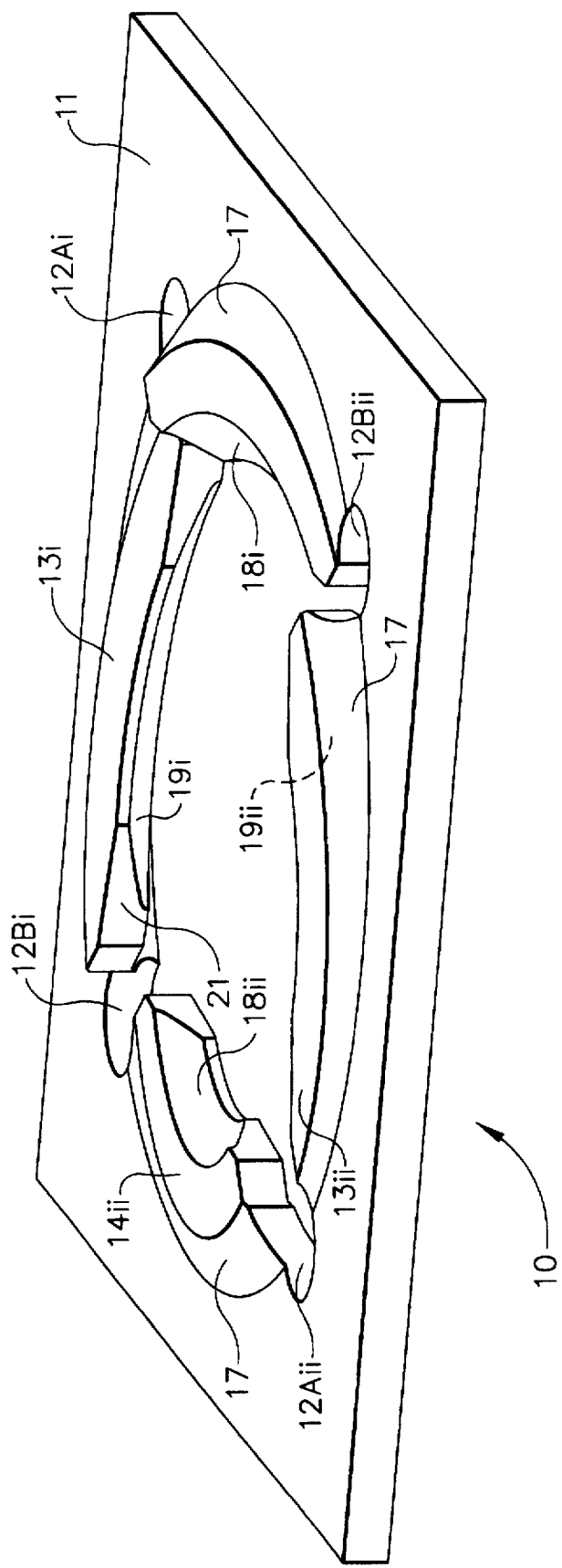
FIG. 3 is a perspective view of a lamina with four half-thread segments with a square perimeter.

Another embodiment of this disclosure is depicted in FIG. 3 which features a lamina with four threaded segments. Many of the aspects possessed by the two-segment lamina apply to the four-segment lamina with the readily apparent exception that there are two pairs of diametrically opposed, identical thread segments per lamina. The assembled thread form created when the four segment laminae are stacked creates a "double lead" thread, which comprises two distinct threads. The double lead thread design would have twice the thread lead of a conventional single lead thread with a correspondingly increased helix angle. One advantage of the double lead thread is that for each rotation of the nut or fastener, the axial advance is twice that of a conventional single lead thread. This would be advantageous in certain work situations where speed of assembly is important.

In the four-segment internally treaded lamina depicted in FIG. 3, there are two thread segments with upper thread faces which span approximately 90 degrees each and are diametrically opposed. They differ only in that one segment 18 i will form one thread of the double lead thread and 18 ii will form the other thread. There is also a similar relationship for lower thread faces 19 i and 19 ii.

Figure 4:
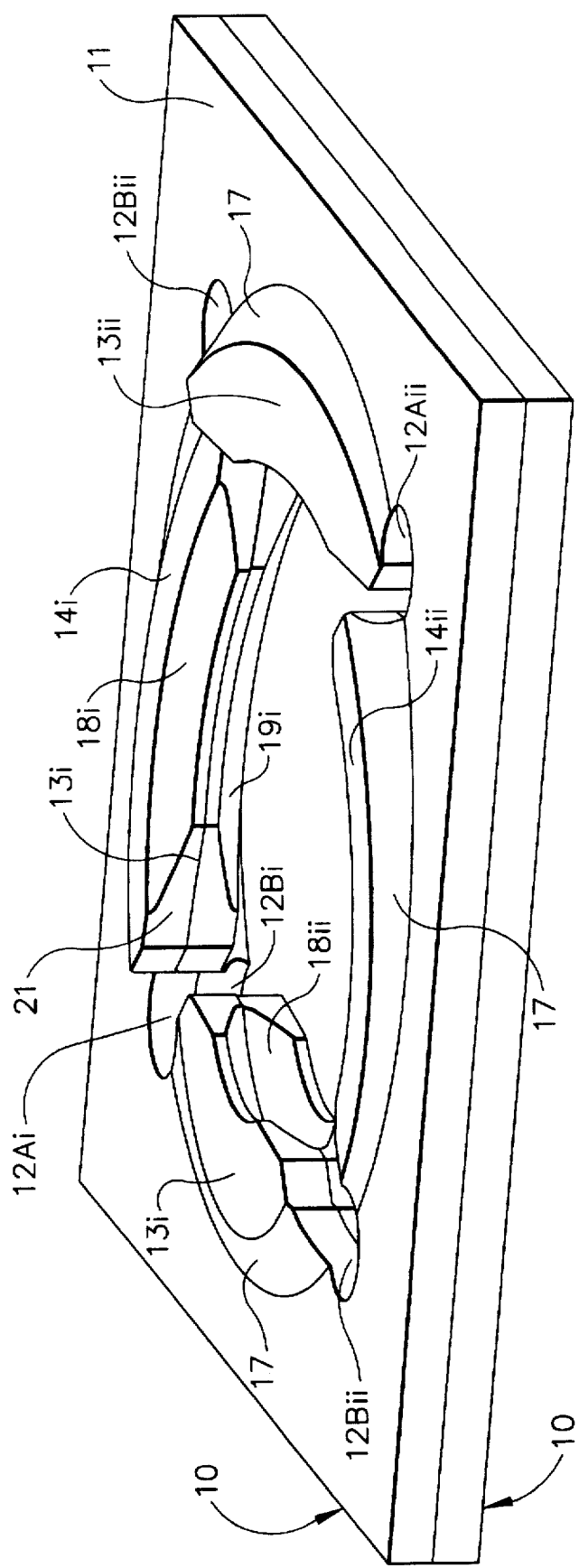
FIG. 4 is a perspective view of a laminated internally threaded fastener comprising a two-lamina assembly of the laminae of FIG. 3.

The two-lamina assembly of FIG. 4 illustrates how the laminae are stacked to form full threads. On stacking the laminae, the orientation holes 1 2A are rotated about the threaded axis by either 90 degrees or 270 degrees to be in alignment with orientation holes 12B of the adjacent lamina. When the laminae are stacked thusly, the paired helix faces 13 are in contact and a complete thread segment is formed by the marriage of the upper thread face 18 i and the lower thread face 19 i. Likewise, another complete thread segment is formed comprising upper thread face 18 ii and lower thread face 19 ii. This second thread is diametrically opposed to the first and forms the other thread of the double lead thread.

This disclosure is also applicable to a lamina with triple lead threads, quadruple lead threads, and so on. In each case, the lamina would have twice the number of thread segments as the number of thread leads, and the stacking increment angle would be 360 degrees divided by the number of thread segments.

Referring once again to FIG. 1, it is apparent that the lamina itself, as well as the elements of the thread, can be formed by stamping, punching or injection molding material, typically metallic in nature. However, it is envisioned that fastening devices according to this disclosure can be fabricated from a variety of other materials including plastics and composites. Clearly, any material that is malleable enough to be formed into the desired shape can be employed to advantage in manufacturing laminated fasteners. Also sheet materials can be plated for corrosion resistance either prior or subsequent to forming. Since there are no thread roots in a laminated nut, there is less susceptibility to chemical action or embrittlement from plating residues at these locations.

Whether manufacturing the laminae by die-cast stamping, pressure forming or injection molding, it is apparent that all aspects of the lamina, including the shape, orientation holes and thread elements can be formed in one quick operation. The thread elements will typically include a helix plane 13 which will spiral upward and be supported or banked by an increasingly elevated ramp-up 17. The gradual elevation of the helix plane 13 follows the helix of the thread. The opposite side of the helix plane 13, as depicted in FIG. 1, is the root plane 14, which is adjacent the lower thread face 19. The lower thread face is paired with a diametrically situated upper thread face 18. Chambers 21 ease assembly and manufacture.

Not only is the threaded lamina, formed according the present disclosure, easier and less expensive to fabricate, it has been observed that formed threads are stronger than cut threads. The threaded aspect of the lamina can also contain additional features such as locking ramps, which can be coined anywhere on the face of the lamina, including areas which would not be accessible on traditionally tapped or rolled-thread nuts.

It has also been observed that laminated fastening devices have their own locking features. By torquing the topmost laminae, while holding the lower ones stationary, a laminated nut will twist then jam within itself, thus eliminating the need for a jam nut or lock washer in a locking-desired situation. And furthermore, by manufacturing the laminae with slight dishing curvatures, the nuts will be spring-like and self-locking, a valuable feature when encountering vibration. It should also be apparent that the assembled fastener made according to the teaching of this specification is compatible with and can be used in conjunction with sealing devices such as specially treated or coated washers and the like. These sealing devices can also manifest themselves as rubber, plastic or other compressible materials frequently seen in an annular configuration within and surrounded by a traditionally configured washer.

It should also be apparent that the assembled fastener made according to the teaching of this specification can be used with standard hand wrenches and power tools to replace and in lieu of conventional internally threaded fasteners.

All of the foregoing features and variations can be appreciated and realized when fabricating threaded fasteners from laminae formed according to the instant disclosure. And while the foregoing is a complete and detailed description of the preferred embodiments of the disclosed device, other variations and modifications may also be employed to implement the purpose of the invention; and, therefore, the instant elaboration should not be assumed to limit the scope of the invention which is intended to be defined by the following claims.

What is claimed is:

1. An internally threaded fastener comprising a plurality of joined laminae, each lamina having an internal bore surface forming less than one full thread form in a plane through the helix of the tread with the internal bore surfaces of at least two adjacent laminae forming a full thread form in the helix plane, and with each lamina having a periphery accommodating a wrenching tool.

2. A fastener according to claim 1 where each lamina is identically shaped.

3. A fastener according to claim 1 wherein the internal bore of each lamina contributes one-half of the thread form at the helix plane.

4. A fastener according to claim 1 wherein each lamina is annular.

5. A lamina according to claim 1.

6. A fastening assembly which comprises; an internally threaded member comprising a plurality of joined laminae each lamina having an internal bore forming less than a full thread form in a plane through the helix of the thread, with the internal bore of two or more laminae forming a full thread form in the helix plane, and with each lamina having a periphery accommodating a wrenching tool, and a bolt member threaded to receive said internally threaded member.

\* \* \* \* \*